United States Patent Office 2,963,106
Patented Dec. 6, 1960

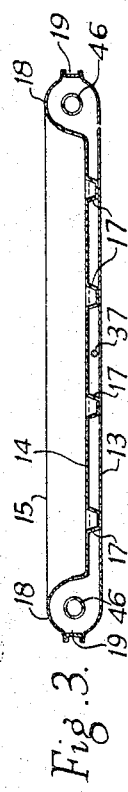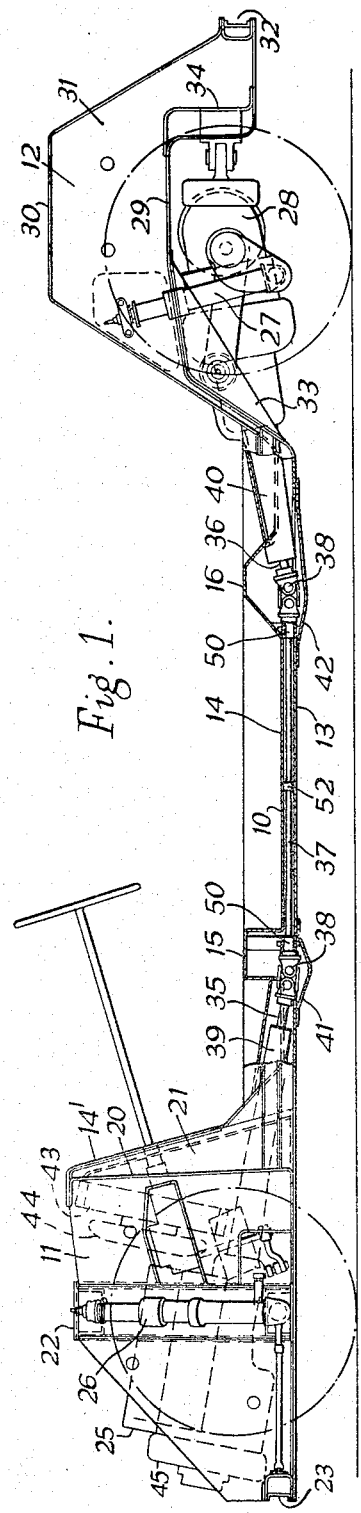

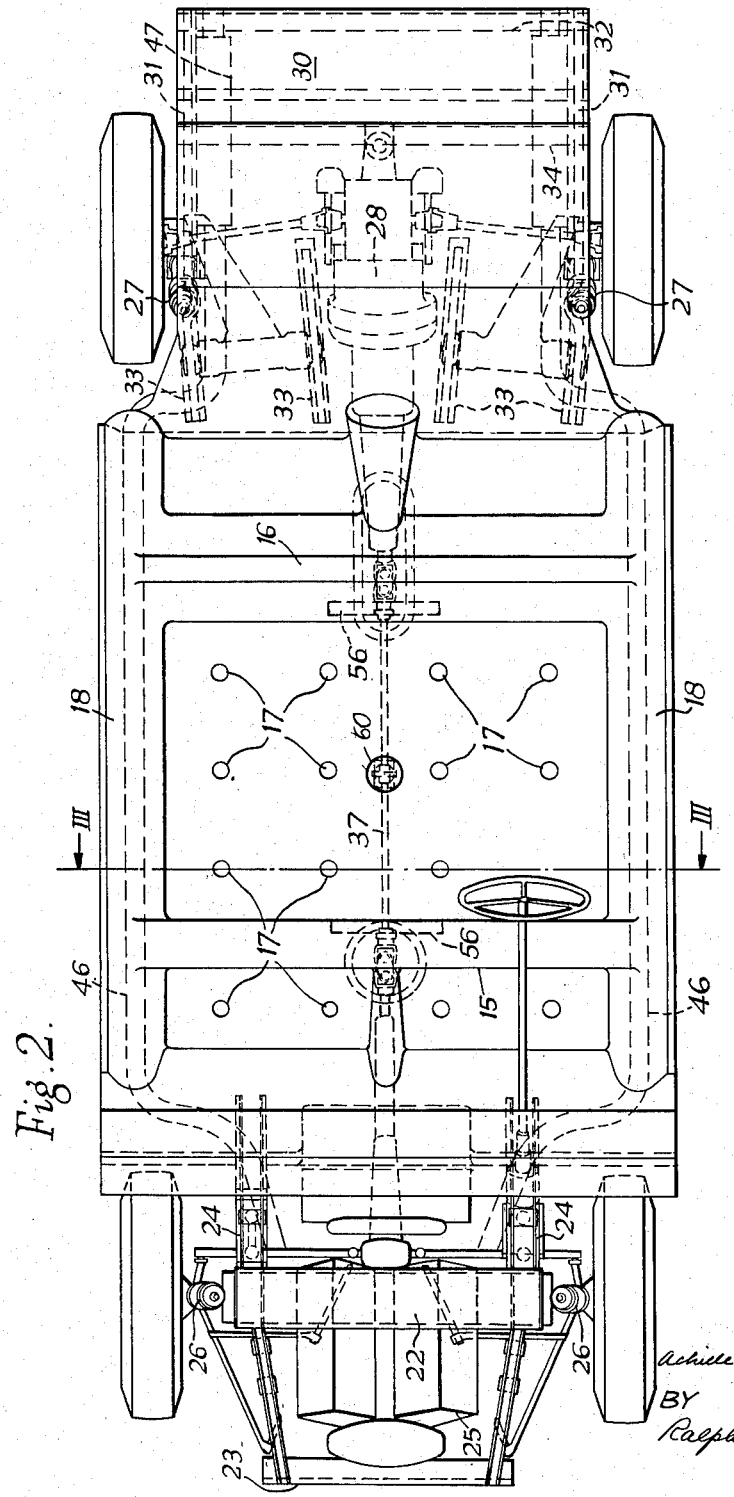

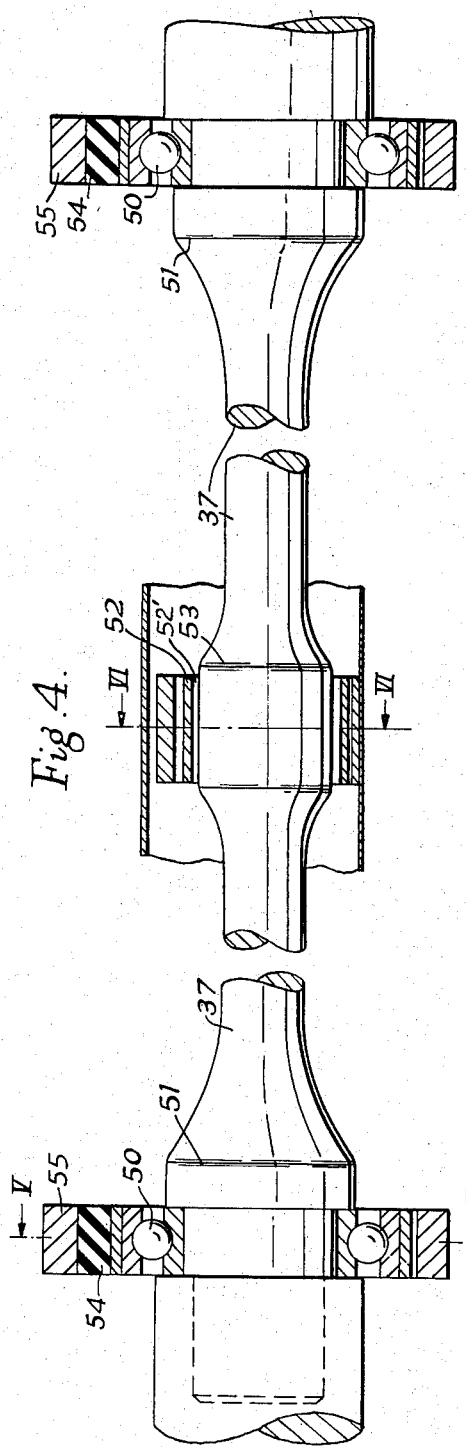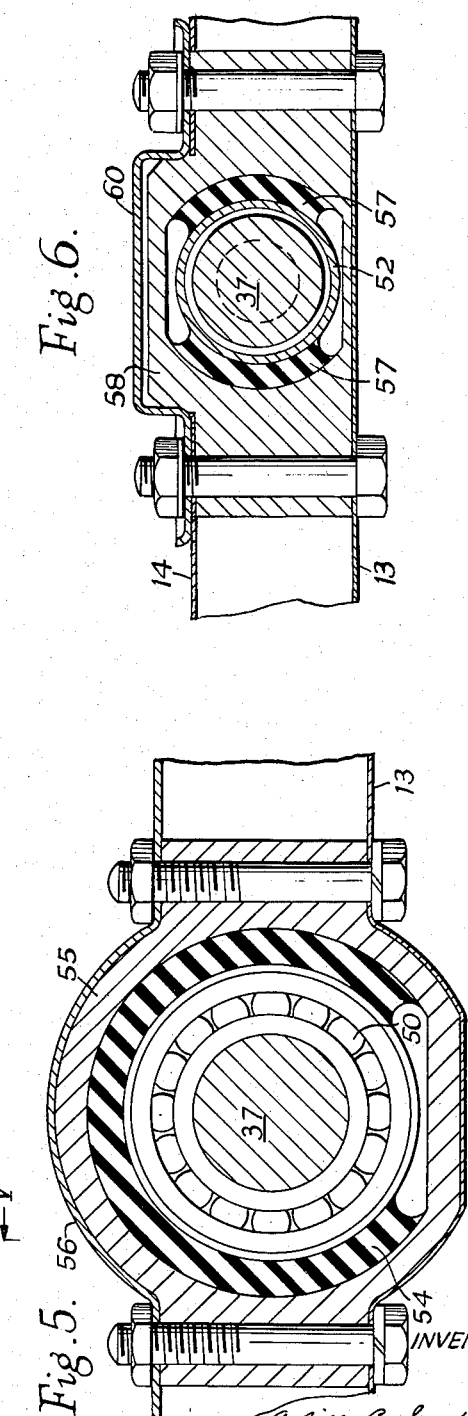

2,963,106

POWER TRANSMISSION MECHANISM FOR AUTOMOBILE VEHICLES

Achille Carlos Sampietro, 286 Puritan, Birmingham, Mich.

Filed Dec. 9, 1957, Ser. No. 701,583

Claims priority, application Great Britain Dec. 17, 1956

6 Claims. (Cl. 180—70)

This invention relates to automobile vehicles of the kind in which the rear wheels are driven by an engine arranged at the front of the vehicle, and the driving connection between the engine and the rear wheels includes a propeller shaft extending longitudinally of the vehicle.

Conventionally, in a vehicle of this kind the engine shaft is substantially horizontal and the propeller shaft extends downwardly and rearwardly between the engine and the rear axle. Since however the centre of gravity of a vehicle is preferably arranged as low as possible above the ground in order to improve the stability of the vehicle, particularly when cornering, the floor of the vehicle is arranged at the minimum height above the ground concomitant with providing the necessary clearance between the underside of the vehicle and the ground, and the propeller shaft is accommodated in a tunnel or casing which projects above the general plane of the floor.

One object of the invention is to provide a power transmission mechanism for an automobile vehicle having a slender propeller shaft, whereby the use of an upwardly projecting tunnel in the floor of the vehicle may be avoided.

A further object of the invention is to provide an automobile vehicle having a lower centre of gravity than in conventional vehicles.

An embodiment of the invention will now be described by way of example with reference to the accompanying drawings, in which:

Fig. 1 is a part sectional side elevation view of the chassis of a vehicle according to the invention;

Fig. 2 is a plan view of the chassis;

Fig. 3 is a sectional view of the frame of the vehicle, taken along the line III—III of Fig. 2;

Fig. 4 is a view of the front, centre and rear portions of the propeller shaft, together with its support bearings;

Fig. 5 is a cross-sectional view of the front bearing for the propeller shaft, taken along the line V—V of Fig. 4;

Fig. 6 is a cross-sectional view of the centre bearing for the propeller shaft, taken along the line VI—VI of Fig. 4.

As shown in Figs. 1–3, the frame of the vehicle comprises a central platform 10 forming the floor of the vehicle, a front extension 11 providing the mountings for the engine and the front suspension, and a rear extension 12 providing the mountings for the change speed gearing, the differential gearing, and the rear suspension.

The central platform 10 is formed of two horizontally superimposed skins 13, 14. The lower skin 13 is a flat metal sheet which forms the undersurface of the vehicle, and the upper skin 14 is a metal sheet formed with two upwardly projecting transverse ribs 15, 16 and a plurality of downwardly projecting indentations 17 (see Figs. 2 and 3). The indentations 17 are welded to the lower skin 13 so that the two skins are rigidly secured together with the general planes of the two skins in spaced relationship. The side margins of the two skins are shaped to form two conduits 18 of susbtantially circular cross section (see Fig. 3) and extending one along each side of the platform 10 (Fig. 2), and the side edges of the skins are welded to chanel shaped side members 19. The front portion 14' of the upper skin 14 projects upwards and is supported by a vertical metal plate 20 welded to the two skins 13, 14, the front portion of the skin 14 and the plate 20 forming a double skin partition or dash 21 arranged to separate the engine from the passenger compartment of the vehicle.

The front extension 11 of the frame comprises an inverted U-shaped yoke piece 22 and a front cross member 23 which are carried by two brackets 24 (Fig. 2) welded to and extending forwardly from the dash 21. The engine 25 and the front suspension 26 are mounted on the yoke piece 22 and cross member 23.

The rear extension 12 of the frame, which houses the rear suspension 27 and a differential and change speed unit 28, comprises the rear portion 29 of the skin 13 and a further sheet metal skin 30 welded to the central platform 10. The two skins 29, 30 are reinforced by two side plates 31 and a rear cross member 32. The rear suspension 27 is mounted on the side plates 31 and on brackets 33 welded to the skin 29, and the differential and change speed gearing unit 28 is mounted on a cross bracket 34 welded to the skin 29. The differential and change speed gearing unit 28 can conveniently be of the form described and illustrated in my co-pending patent application No. 687,159, filed Sept. 30, 1957, and is arranged with the axis of the gears inclined forwardly and downwardly.

The driving connection between the engine 25 and the differential and change speed unit 28 comprises a front shaft 35 drivably connected to the drive shaft of the engine and extending rearwardly and downwardly from the engine, a rear shaft 36 drivably connected to the input shaft of the differential and change speed unit 28 and extending forwardly and downwardly from the unit 28, and a propeller shaft 37. The shaft 35 is mounted in a casing 39 rigidly secured to the engine block and the assembly comprising the engine 25 and the casing 39 is inclined downwardly and rearwardly and is arranged so that the rear end of the shaft 35 is at a level below that of the undersurface of the engine and is disposed between the two skins 13, 14 adjacent the rib 15 of the platform 10 of the frame. Similarly, the shaft 36 is mounted in a casing 40 rigidly secured to the housing of the differential and change speed unit 28 and the assembly comprising the unit 28 and the casing 40 is inclined downwardly and forwardly and is arranged so that the front end of the shaft 36 is at a level below that of the undersurface of the unit 28 and is disposed between the two skins 13, 14 adjacent the rib 16 of the platform 10. The propeller shaft 37 is disposed between the two skins 13, 14 of the central platform 10 and is coupled by double universal joints 38 to the rear and front ends of the shafts 35, 36 respectively, the two joints being located beneath the transverse ribs 15, 16.

The double universal joints 38 are not shown in detail since they are of conventional construction, each joint comprising a short yoke piece having a Hooke joint at each end thereof for coupling the propeller shaft to the adjacent shaft 35 or 36. The double universal joints provide homocynematic transmission of motion between the shafts and only the yoke pieces are subject to cyclic speed variations. The propeller shaft 37 is however torsionally elastic and may be coupled to the shafts 35, 36 by single Hooke joints, the resilience of the propeller shaft 37 compensating for the cyclic speed variations produced by the Hooke joints. Alternatively, the propeller shaft 37 may be drivably connected to the shafts 35, 36 by bevel gears. The double universal joints 38 are located between the skins 13, 14 of the central platform 10 and are thereby protected from road dirt. Access to the joints, for maintenance purposes, is obtained through apertures formed in the lower skin 13, the apertures being normally sealed by detachable cover plates 41, 42.

The engine 25 is located at the front of the frame and, contrary to conventional arrangements for automobile vehicles, the radiator 43 and fan 44 are positioned between the engine 25 and the dash 21. The engine 25 is thus positioned at the maximum possible distance in front of the propeller shaft 37 so that the engine 25 and the casing 39 need only be inclined at a small angle to the horizontal in order that the end of the shaft 35 may be positioned at a level below that of the undersurface of the engine. In addition the flywheel casing 45, which projects downwards below the sump of the engine, is arranged at the front of the engine since, due to the inclination of the engine to the horizontal, there is more ground clearance at the front than at the rear of the engine.

The radiator may if desired be positioned in front of the engine, but the preferred arrangement in which the radiator is behind the engine gives a better balance and distribution of the component parts of the chassis, and facilitates assembly and servicing of the engine. Moreover, the fan and radiator are more efficient when positioned behind the engine and cool air for the high compression engine may be drawn directly from the front of the vehicle.

The exhaust gases from the engine are led away through pipes 46 (Fig. 2) which pass through the conduits 18 formed by the skins 13, 14 at each side of the platform 10, and the pipes 46 are connected at their rear ends to silencers 47 mounted underneath the rear extension 12 of the frame.

Since the change speed gearing is located in the unit 28 at the rear of the vehicle, the propeller shaft 37 only transmits the torque of the engine and is of relatively small diameter compared to the propeller shafts of conventional arrangements which transmit the larger torque output of change speed gearing. The slenderness of the propeller shaft 37 would however cause whirl at high speed, and the propeller shaft is therefore supported in rubber insulated bearings. As shown in Fig. 4 the propeller shaft 37 is provided with two roller bearings 50 mounted upon enlarged portions 51 at the ends of the propeller shaft and with a plain bearing 52 mounted adjacent an enlarged portion 53 at the centre of the propeller shaft. Each bearing 50 (Fig. 5) is mounted upon a part circular rubber support 54 which is itself mounted within a metal housing 55 clamped between the lower skin 13 and a bracket 56 welded to the adjacent rib of the platform 10. The bearing 52 is mounted upon two arcuate rubber supports 57 arranged on opposite sides of the bearing and bonded to the sides of a metal housing 58 which is clamped between the two skins 13, 14. A detachable cover plate 60 which seals an aperture in the upper skin 14 immediately above the bearing 52 permits access and removal of the housing 58 and bearing 52.

The inner races of the ball bearings 50 are a tight fit on the enlarged portions 51 of the propeller shaft 37, and the rubber supports 54 permit a small degree of freedom of movement of the bearings 50 within the housings 55. A small clearance 52' is however provided between the plain bearing 52 and the enlarged portion 53 of the propeller shaft 37 so that the bearing 52 is clear of the propeller shaft under normal running conditions and is not therefore subject to wear in normal use. When an incipient whirl condition exists the propeller shaft 37 is deflected outwards away from its normal axis of rotation and engages the bearing 52, thereby "detuning" the shaft 37 and preventing the whirl from building up.

The bearing 52 is preferably made of "Teflon" or otherwise made so as not to require lubrication.

The frame of the vehicle, although of light sheet metal construction, is sturdy and rigid and does not rely on the body of the vehicle to provide rigidity. The body may therefore be of any suitable shape or style and is secured by any suitable means on to the frame. The seats of the vehicle can conveniently be mounted on the ribs 15, 16 with the upper surface of the platform 10 between the two ribs forming a floor for the vehicle which is flat over a major portion of its area. The floor of the vehicle is not obstructed by a tunnel for the propeller shaft, as in conventional automobile vehicles, and the arrangement of the engine, change speed bearing and propeller shaft provides a lower centre of gravity than in conventional arrangements.

In addition the double skin construction of the frame avoids the resonance of the sheet metal panels associated with conventional constructions in which the frame and the body form an integral unit. Moreover, the strong double skinned dash 21 between the engine and the passenger compartment of the vehicle insulates the passengers from the heat and noise of the engine and provides a barrier protecting the passengers in case of collision. The double skins of the frame and the dash can also conveniently serve as ducts for the circulation of hot or cold air to warm or cool the interior of the vehicle.

I claim:

1. In an automobile vehicle, a frame comprising two horizontally superimposed skins, the upper skin of the frame being formed with two upwardly projecting transverse ribs and with a plurality of indentations in engagement with and rigidly secured to the lower skin, an engine arranged at the front of the frame and including a drive shaft and a flywheel mounted at the front of the drive shaft, said engine being arranged with the axis of the drive shaft inclined downwardly and rearwardly, a differential and change speed unit adjacent the rear of the frame, said unit being arranged with its axis inclined downwardly and forwardly, power transmitting means including a front shaft, a rear shaft, and a substantially horizontal slender propeller shaft, said front shaft being drivably connected to the engine drive shaft and directed rearwardly and downwardly from the engine, and said rear shaft being drivably connected to the differential and change speed unit and directed downwardly and forwardly from said unit, universal joints connecting the ends of the propeller shaft to the front and rear shafts, said propeller shaft being disposed between the two skins and the universal joints being located one below each of said transverse ribs, two bearings resiliently mounted between the two skins and supporting the ends of the propeller shaft, and a further bearing resiliently mounted between the two spins and surrounding the propeller shaft intermediate the ends thereof, the wall of said further bearing being spaced with small clearance from the propeller shaft whereby the propeller only engages said further bearing when deflected from its normal rotational axis under whirl conditions.

2. In an automobile vehicle, a frame, an engine arranged at the front of the frame, differential and change speed gearing arranged adjacent the rear of the frame and drivably coupled to the rear wheels, power transmitting means including a slender propeller shaft interconnecting the engine and said gearing, a bearing having an internal cylindrical wall surface surrounding said propeller shaft intermediate the ends thereof, and support means of elastic material supporting the bearing on the frame, the said bearing having an internal wall of a diameter larger than the diameter of the propeller shaft to provide a space therebetween, whereby the propeller shaft only engages the bearing when deflected from its normal rotational axis under whirl conditions.

3. In an automobile vehicle, a frame, an engine arranged at the front of the frame, differential and change speed gearing arranged adjacent the rear of the frame and drivably coupled to the rear wheels, power transmitting means including a slender propeller shaft interconnecting the engine and the differential and change speed gearing, two bearings resiliently mounted on the frame and supporting the ends of said propeller shaft, a further bearing having an internal cylindrical wall surface surrounding the central portion of the said propeller shaft, and support means of elastic material supporting said further bearing on the frame, the said further bearing having an internal wall of a diameter larger than the diameter of the propeller shaft to provide a space therebetween, whereby the propeller shaft only engages the said further bearing when deflected from its normal rotational axis under whirl conditions.

4. In an automobile vehicle, a frame, an engine arranged at the front of the frame, a differential and change speed unit arranged adjacent the rear of the frame, a power transmitting means including a front shaft, a rear shaft, and a substantial horizontal slender propeller shaft connecting the front and rear shafts, said front shaft being drivably connected to the engine and directed rearwardly and downwardly from the engine, and said rear shaft being drivably connected to the differential and change speed unit and directed rearwardly and upwardly to the said unit, a bearing surrounding said propeller shaft intermediate the ends thereof, and support means of elastic material supporting the bearing on the frame, the said bearing including a sleeve of self-lubricating material having an internal wall of a diameter larger than the diameter of the propeller shaft to provide a space therebetween, whereby the propeller shaft only engages the sleeve when deflected from its normal rotational axis under whirl conditions.

5. In an automobile vehicle, a frame, an engine arranged at the front of the frame and including a drive shaft and a fly wheel mounted at the front of the drive shaft, said engine being arranged with the axis of the drive shaft inclined downwardly and rearwardly, a differential and change speed unit adjacent the rear of the frame, said unit being arranged with its axis inclined downwardly and forwardly, power transmitting means including a front shaft, a rear shaft, and a substantially horizontally slender propeller shaft drivably connecting the front and rear shafts, said front shaft being drivably connected to the engine drive shaft and directed downwardly and rearwardly from the engine, and said rear shaft being drivably connected to the differential and change speed unit and directed downwardly and forwardly from said unit, two bearings resiliently mounted on the frame and supporting the ends of said propeller shaft, a further bearing surrounding said propeller shaft intermediate the ends thereof, and support means of elastic material supporting said further bearing on the frame, the said further bearing including a sleeve of self-lubricating material having an internal wall of a diameter larger than the diameter of the propeller shaft to provide a space therebetween, whereby the propeller shaft only engages the sleeve when deflected from its normal rotational axis under whirl conditions.

6. In an automobile vehicle, a frame comprising two horizontally superimposed skins, at least one of said skins being formed with a plurality of indentions in engagement with and rigidly secured to the other skin, an engine arranged at the front of the frame, differential gearing arranged adjacent the rear of the frame and drivably coupled to the rear wheels, power transmitting means including a substantially horizontal slender propeller shaft interconnecting the engine and the differential gearing, said propeller shaft being disposed between the two skins, a bearing surrounding said propeller shaft intermediate the ends thereof, and support means of elastic material supporting the bearing between the two skins of said frame, the said bearing including a sleeve of self-lubricating material having an internal wall of a diameter larger than the diameter of the propeller shaft to provide a space therebetween, whereby the propeller shaft only engages the sleeve when deflected from its normal rotational axis under whirl conditions.

References Cited in the file of this patent

UNITED STATES PATENTS

| | | |
|---|---|---|
| 1,070,772 | Caillet | Aug. 19, 1913 |
| 1,189,284 | Nelson | July 4, 1916 |
| 1,300,560 | Bicknell et al. | Apr. 15, 1919 |
| 2,075,084 | Best | Mar. 30, 1937 |
| 2,092,291 | Olsen | Sept. 7, 1937 |
| 2,107,382 | Maddock | Feb. 8, 1938 |
| 2,125,441 | Haltenberger | Aug. 2, 1938 |
| 2,168,108 | Bunau-Varilla | Aug. 1, 1939 |
| 2,223,395 | Van Buren | Dec. 3, 1940 |
| 2,234,781 | Schjolin | Mar. 11, 1941 |
| 2,240,317 | Swenson | Apr. 29, 1941 |
| 2,297,198 | Borgward | Sept. 29, 1942 |
| 2,382,246 | McFarland | Aug. 14, 1945 |
| 2,389,498 | Gates | Nov. 20, 1945 |
| 2,622,949 | Cotchett | Dec. 23, 1952 |
| 2,738,023 | Barenyi | Mar. 13, 1956 |
| 2,820,523 | Earl | Jan. 21, 1958 |

FOREIGN PATENTS

| | | |
|---|---|---|
| 884,747 | France | May 3, 1943 |
| 743,439 | Germany | Dec. 27, 1943 |

OTHER REFERENCES

Publication: "Automotive Industries," Sept. 1, 1954, pp. 107 and 108.